INVENTOR
William E. Wine
BY Ritter & Mechlin
his ATTORNEYS

Oct. 16, 1934.　　　W. E. WINE　　　1,976,871
APPARATUS FOR MAKING A VOLUTE SPRING
Filed Dec. 23, 1931　　4 Sheets-Sheet 2

INVENTOR
William E. Wine
BY
Ritter & Mechlin
his ATTORNEYS

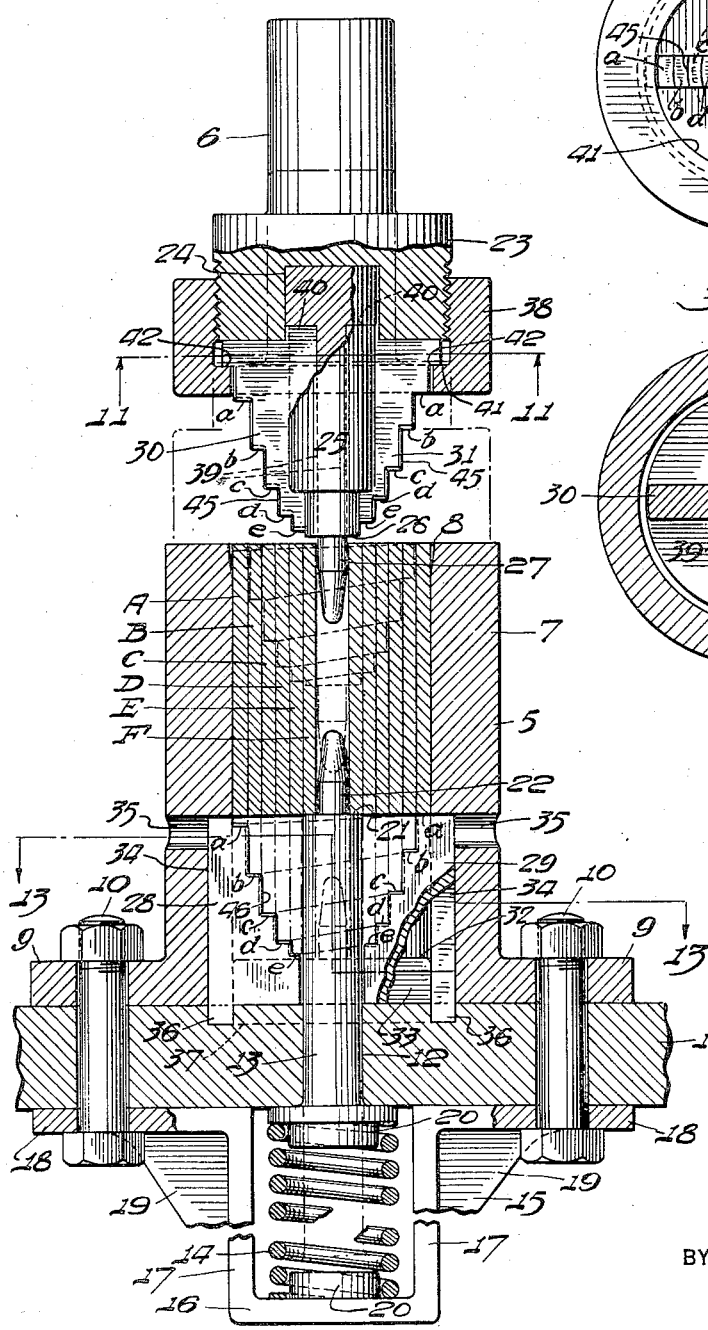

Oct. 16, 1934.  W. E. WINE  1,976,871
APPARATUS FOR MAKING A VOLUTE SPRING
Filed Dec. 23, 1931  4 Sheets-Sheet 4
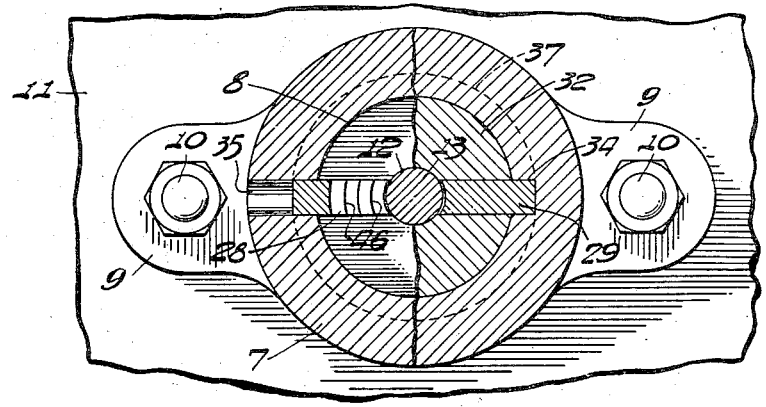
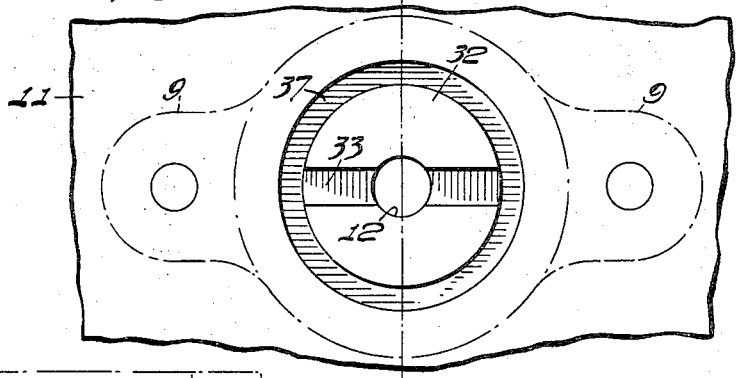
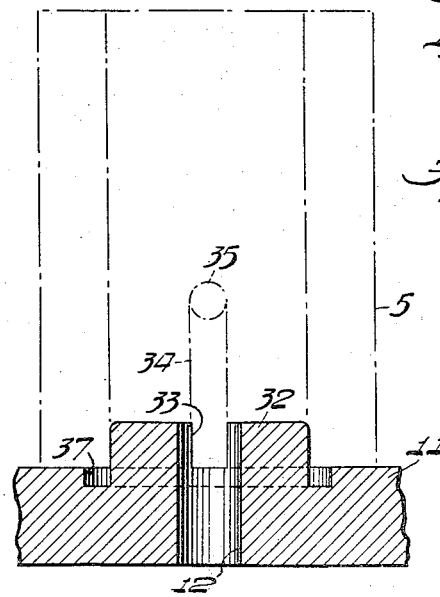
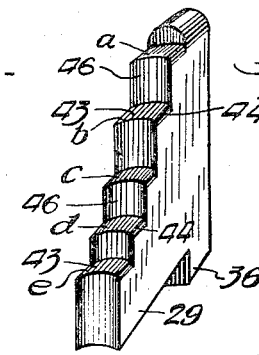
INVENTOR
William E. Wine
BY Ritter & Mechlin
his ATTORNEYS Patented Oct. 16, 1934

1,976,871

UNITED STATES PATENT OFFICE 1,976,871

APPARATUS FOR MAKING A VOLUTE SPRING

William E. Wine, Toledo, Ohio

Application December 23, 1931, Serial No. 582,864

11 Claims. (Cl. 153—48)

My invention relates to apparatus for forming volute springs which, although capable of general use, are primarily designed for use in railway car trucks.

A principal object of the invention is to provide an apparatus for forming a volute spring from a substantially cylindrical coil having a plurality of overlapping convolutions by displacing the convolutions of the coil varying amounts longitudinally of the axis thereof.

A primary feature of the invention consists in providing the apparatus with a coil receiving member having a substantially plate-like member provided with a plurality of stepped portions affording means limiting the distance the convolutions of the coil may be displaced with respect to each other.

Another feature of the invention consists in providing the apparatus with two relatively movable members each of which is provided with at least one plate-like member having a plurality of stepped portions, the stepped portions of one of the plate-like members being respectively engageable with the convolutions of the coil for displacing the latter and the stepped portions of the other plate-like member being engageable with the convolutions for limiting the amount of displacement thereof.

A further feature of the invention consists in providing the apparatus with a coil receiving member and in associating therewith means for partially ejecting the coil from the member after it has been formed into a volute.

Other and more specific features of the invention residing in advantageous forms, combinations and relations of parts will hereinafter appear and be pointed out in the claims.

In the drawings illustrating the invention:

Figure 9 is a vertical sectional view of the apparatus for displacing the convolutions of the coil shown in Figures 4 and 5 into the positions shown in Fig. 6.

Figure 10 is an end view of the coil extending or displacing means.

Figure 11 is a sectional view taken on line 11—11, Figure 9.

Figure 12 is a side elevational view of the pin or post member of the coil displacing means.

Figure 13 is a sectional view taken on line 13—13, Figure 9.

Figure 14 is a plan view of the bed or base member of the apparatus.

Figure 15 is a sectional view taken on line 15—15 of Figure 14, the coil receiving member being shown in dot and dash lines.

Figure 16 is a perspective view of one of the stepped or shouldered plate-like members of the apparatus.

While any suitable method may be followed in making a volute spring from a metallic blank of suitable shape, the method involving the following steps is preferred: First, heating the blank; second, providing an eye at one end of the blank; third, coiling the heated blank into a plurality of overlapping convolutions; fourth, relatively displacing some of the convolutions of the coil thus formed while they are still hot; and fifth, quenching the convolutions.

Referring more particularly to the drawings, 1 indicates the metal blank which is to be formed into a volute spring and which, as pointed out above, is heated before being worked upon. The blank may be of any suitable spring material and of any desired dimensions depending upon the travel and the capacity which it is intended the spring shall have. Either before or after heating the blank, the edge thereof which when the spring is made will form the major portion of the outer edge of the outermost convolution thereof, is preferably cut away, as indicated at 2, so that it will be disposed in a plane substantially normal with the longitudinal axis of the completed spring and thereby afford an extended bearing area between this end of the spring and the member or element with which it is designed to cooperate when in use.

Figure 1:
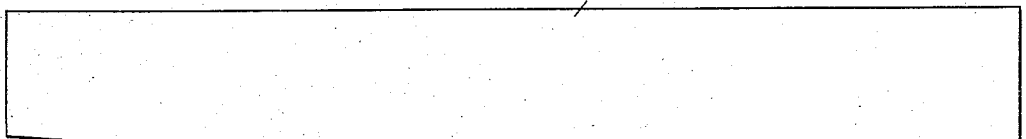
Figure 1 is a plan view of the blank to be operated upon.
Figure 2:
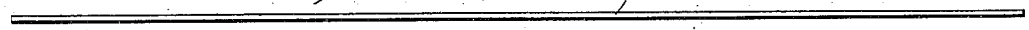
Figure 2 is a side elevational view of the blank.
Figure 3:
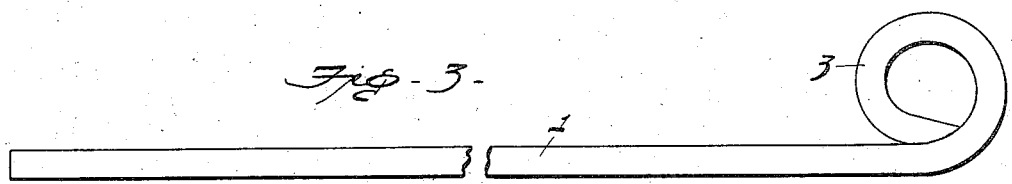
Figure 3 is a side elevational view of the blank after it has been formed at one end with an eye.
Figure 4:
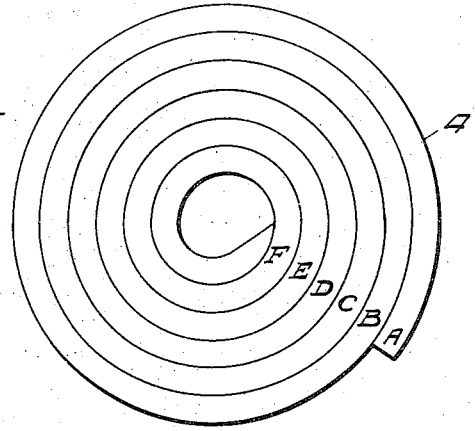
Figure 4 is a plan view of the coil into which the blank is wound.
Figure 5:
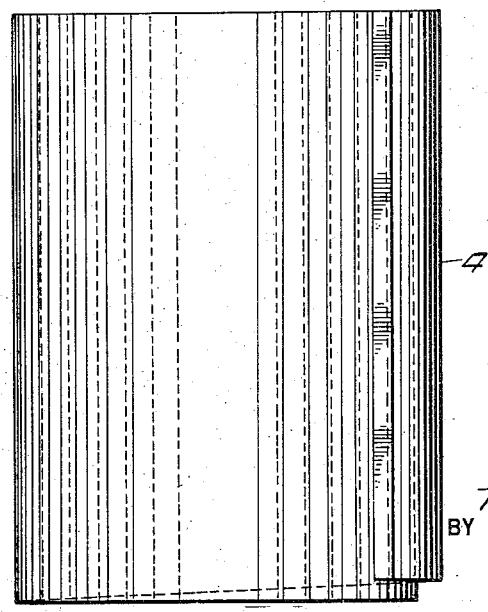
Figure 5 is a side elevational view of the coil.

While the blank is still hot, it is formed by any suitable mechanism into a substantially cylindrical coil having a plurality of overlapping convolutions, each of which has a surface in contact with the adjacent surface of an adjoining convolution. In order that the blank may be easily and conveniently coiled, it may be, if desired, preliminarily formed by any desired means with an eye 3. The preferred form into which the blank is coiled is illustrated in Figures 4 and 5, and although the coil shown therein has six convolutions, respectively designated by the reference letters A, B, C, D, E, and F, it is to be understood that the method and apparatus herein disclosed is not limited to forming a volute spring from a coil having that number of convolutions. Moreover, although for purposes of illustration, a metallic blank of substantially rectangular shape has been chosen, it is also to be understood that the invention is not limited to forming a spring from a blank of this shape as the method and apparatus herein disclosed may be used in forming a spring from a metallic blank of substantially any desired shape. However, irrespective of its shape, the blank is preferably coiled about an axis either normal to its longitudinal axis or normal to the major portion of one edge thereof so that either one or both of the ends of the convolutions will be disposed in planes substantially normal to the axis of the coil or at most, in the case of an irregularly shaped blank, will not extend beyond parallel planes normal to the axis of the coil and passing through the edges of the portion of the blank of maximum width.

Figure 6:
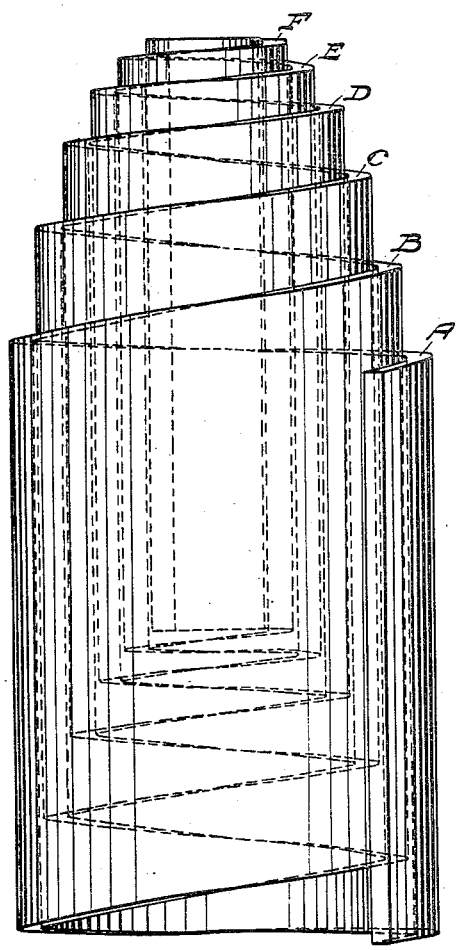
Figure 6 is a side elevational view of a conical volute formed by displacing some of the convolutions illustrated in Figures 4 and 5, in a direction substantially parallel with their longitudinal axes.

The next step in the method of forming the volute spring is to displace some of the convolutions of the coil varying amounts while they are still hot, in a direction substantially parallel with their longitudinal axes. Although it is preferred to displace the convolutions in such a manner as to form a substantially conical volute, as shown in Figure 6, the method herein disclosed is not limited to forming a volute of this character as volutes of other types may be readily formed by varying the amount of relative displacement of the convolutions, or by displacing some convolutions in one direction and others in the opposite direction. By longitudinally displacing the convolutions, the adjacent surfaces of adjoining convolutions are displaced laterally thereby moving them out of contact with each other and automatically providing sufficient clearance to prevent the surfaces from moving into contact until the convolutions are fully compressed, at which time the coil will assume the cylindrical form shown in Figures 4 and 5.

To insure extended bearing area between the innermost convolution of the spring and the member or element with which it is designed to cooperate when in use, this convolution is subjected to endwise pressure of sufficient magnitude to cause its outer end to be disposed in a plane substantially normal with the longitudinal axis of the spring. As shown in Figure 6 convolutions B, C, D, E, and F of the coil are displaced varying amounts relative to convolution A and it is preferred, as shown in this figure, that the convolutions be displaced to such an extent that the ratio of the pitch and mean diameter of each will equal a constant. In this manner the fiber stress of the material in each convolution will be substantially the same. However, instead of having the ratio of the pitch and mean diameter of each convolution a constant, it may be advantageous under some circumstances to vary this ratio, and it is to be understood that the method is not limited to forming a spring in which the ratio of the pitch and mean diameter of each convolution is equal.

After the convolutions are displaced the desired amount and in the desired direction, the coil as a whole is quenched or tempered by being immersed in a bath of oil or other suitable liquid. Due to the clearance or space between each convolution, the oil will readily contact with all surfaces of the coil so that all portions of each convolution will have a substantially uniform temper.

Figure 7:
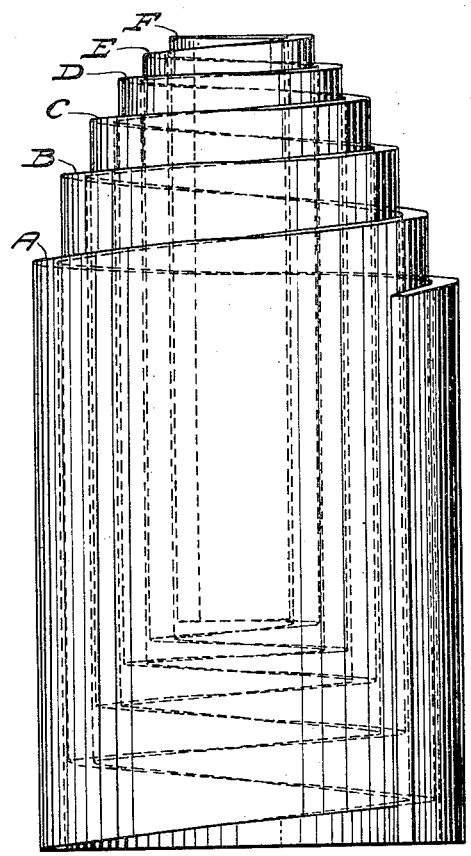
Figure 7 is a side elevational view of the completed volute spring.
Figure 8:
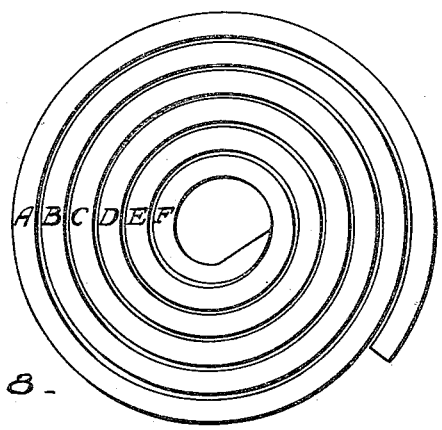
Figure 8 is a plan view of the spring illustrated in Figure 7.

Due to imperfections which are inherent in substantially all metal, certain portions of some or all of the convolutions will have a higher or greater initial fiber stress than the average fiber stress of all of the convolutions. To bring these fiber stresses into balance, the spring, before being put into use, is subjected to compressive forces of sufficient magnitude to fully compress it. It has been found that it is necessary to compress the spring only about five or six times to bring about this balance of the fiber stresses. However, it will be found that if the stress of some of the fibers is considerably greater, or under some circumstances only slightly greater, than the average fiber stress, these overstressed portions of the convolutions will take a permanent set thereby causing a decrease in the free height of the spring. The amount of permanent set that will occur depends not only on the amount localized portions of the fibers are initially over-stressed but also on the amount the fibers are stressed when the convolutions are compressed. Figure 7 of the drawings illustrates the completed spring after it has been subjected to the compressive forces, but the showing in this figure is more or less exaggerated as the free height of the spring will ordinarily not decrease an amount equal to the difference in heights of the springs shown in Figure 6 and Figure 7, but the spring has been represented in this manner merely to clearly bring out that some reduction in the height of the spring will occur upon being subjected to compressive forces.

The apparatus for displacing the convolutions of the coil shown in Figures 4 and 5 comprises a coil receiving or supporting means 5 and a displacing means 6 movable relatively thereto. The coil receiving means has a member 7 provide with a substantially cylindrical opening 8 in which the spring is adapted to be disposed, the diameter of the opening being preferably only slightly greater than the outside diameter of the coil. Adjacent its inner end the member 7 is provided with laterally projecting lugs 9 for receiving bolts 10 by which the member may be rigidly secured to a bed or base member 11. Extending through an opening 12 formed in the base member substantially concentrically with the opening 8 in the member 7 is a longitudinally movable pin or rod 13. This rod is normally urged forwardly into the coil receiving opening 8 by a helical spring 14, one end of which engages a portion of the rod 13 and the other end of which is seated on a bracket 15 rigid with the bed member. This bracket may be of substantially U-shape having a web 16 affording a seat for the spring and arms 17 which terminate in laterally projecting flanges 18 which may be secured to the bed member 11 by the bolts 10. The bracket may be conveniently reinforced by suitable ribs or flanges 19. To center the helical spring and to prevent its lateral displacement the end of the rod 13 with which it cooperates and the web 16 of the bracket are preferably formed with bosses 20.

The end of the rod 13 which is normally disposed within the coil receiving opening 8 is formed with a peripheral shoulder 21 and a forwardly extending portion 22 of less cross sectional area than that of the main body of the rod. The portion 22 is adapted to extend within the innermost convolution of the coil while the shoulder 21 affords a seat for the inner end of the innermost convolution whereby the coil may be conveniently supported in the opening preparatory to being operated upon by the displacing means 6. The reduced end portion 22 of the rod will, in the event the diameter of the coil receiving opening 8 exceeds the outside diameter of the coil, serve to center the coil within the opening. However, since the outside diameter of the coil shown in the drawings for purposes of illustrating the invention is only slightly less than the diameter of the coil receiving opening, it will, of course, be appreciated that in the present instance the coil will be centered without the aid of the reduced end portion 22 of the rod.

The coil displacing means 6 has a head member 23 which is preferably of substantially cylindrical form and is provided with a centrally disposed recess or socket 24 for receiving a forwardly extending pin or post member 25. The forward end of the pin is provided with a peripheral shoulder 26 adapted to engage the adjacent end of the innermost convolution and with a reduced end portion 27 adapted to extend within the innermost convolution for centering the displacing means with respect to the coil.

The coil receiving means and the displacing means are each provided with a pair of shouldered members, preferably plate-like in form, the shouldered members of the coil receiving means being respectively designated by the reference numerals 28 and 29 and those of the displacing means being respectively designated by the reference numerals 30 and 31. The shouldered member 28 is adapted to cooperate with the opposite ends of those portions of the convolutions with which the shouldered member 30 cooperates while the shouldered member 29 is adapted to cooperate with the opposite ends of those portions of the convolutions with which the shouldered member 31 cooperates. Although there is shown two shouldered members in each of the main parts of the apparatus, it will be readily understood that the invention is not limited to this number of shouldered members as satisfactory springs have been formed by only providing each of the parts with one shouldered member. Moreover, under some conditions depending upon the particular form the completed spring is to have it may be desirable to provide each part of the apparatus with more than two shouldered members.

Each of the shouldered members is of plate-like form and is provided with a plurality of stepped portions *a*, *b*, *c*, *d* and *e* which are respectively adapted to cooperate with portions of convolutions A, B, C, D and E of the coil. As the shouldered members of each pair are diametrically opposed, the stepped portions of one member of each pair are staggered with respect to the stepped portions of the other member of its pair and when it is desired, as in the present instance, to form a spring in which the ratio of the pitch and mean diameter of each convolution is a constant, the stepped portions of one member of each pair are spaced substantially midway between the stepped portions of the other member of its pair.

In order that the apparatus herein disclosed may be employed in forming springs wherein the ratio of the pitch and mean diameter of the convolutions varies, the shouldered members are preferably detachably mounted on the parts of the apparatus with which they are associated so that they may be easily removed and other members having differently spaced steps employed. The members 28 and 29 may be removably mounted in the coil receiving means by being clamped between members 7 and 11 so that when the latter are disconnected by unfastening the bolts 10 the shouldered members may be quickly removed. The bed member 11 may be advantageously formed with a forwardly projecting circular boss 32 which is concentric with the opening 12 and is provided on diametrically opposite sides of the latter with grooves 33 for receiving the inner end portions of the shouldered members 28 and 29. The circular boss is preferably of slightly less diameter than the inside diameter of the opening 8 in the member 7 and extends thereinto for centering the member with respect to the opening 12 in the bed member. The member 7 is formed on diametrically opposite sides with longitudinally extending grooves 34 in which the outer side portions of the shouldered members 28 and 29 are respectively disposed. So that the grooves 34 may be easily machined the member 7 is formed with radial openings 35 at the forward ends of the grooves. The shouldered members 28 and 29 are prevented from moving inwardly toward each other by being respectively provided with rearwardly extending tangs or lugs 36 which are adapted to be disposed in an annular groove 37 which surrounds the boss 32.

The shouldered members 30 and 31 are removably associated with the displacing means 6 by a sleeve 38 which is threaded upon the head 23. The pin member 25 of the displacing means is provided on opposite sides with longitudinally extending grooves 39 in which the inner side portions of the shouldered members 30 and 31 are disposed. These grooves extend rearwardly beyond the outer face of the head 23 to provide recesses for receiving tangs or lugs 40 formed on the inner ends of the shouldered members. Longitudinal movement of the shouldered members 30 and 31 in the grooves 39 is prevented by the sleeve 38 which is formed with an inwardly projecting annular lip or flange 41 adapted to overlappingly engage the outer faces of the shouldered portions 42 formed on the members 30 and 31. It will be observed that the members 30 and 31 may be easily and quickly removed by merely unscrewing the sleeve 38.

The major portion of each of the steps of the shouldered members is inclined as at 43 so as to be disposed in substantially the same plane in which the relatively small end portion of the convolution with which it is adapted to cooperate will be disposed when the convolution has been displaced the desired amount. To prevent the steps from biting into and thereby upsetting the end portions of the convolutions those portions of the steps which when the spring is being displaced first engage the convolutions are rounded as at 44 to present relatively blunt portions. As the convolutions upon being displaced will overlap the portions of the shouldered members intermediate the steps thereof these intermediate portions of the shouldered members are curved so as to conform to the curvature of the convolutions which they overlap. Thus the portions of the shouldered members 28 and 29 intermediate the steps are curved to afford concave surfaces 45 while the portions of the shouldered members 30 and 31 intermediate their steps are curved to afford convex surfaces 46.

In the operation of the apparatus the coil is inserted in the opening 8 of the member 7, being centered therein either by the reduced end portion 22 of rod 13 or by the walls or the member defining the opening. The inner end of convolution F of the coil will engage the peripheral shoulder 21 on rod 13 and a portion of the end of convolution A will engage step $a$ of shouldered member 29. The coil is, of course, inserted in the opening 7 so that step $a$ of the member 29 will engage convolution A adjacent its side edge. Upon moving the displacing means 6 toward the coil when it is thus supported the reduced end portion 27 of pin 25 will enter the innermost convolution F to center the displacing means with respect to the coil. Continued movement of the displacing means will bring the peripheral shoulder 26 of pin 25 into engagement with the adjacent end of convolution F moving or displacing this convolution in a direction parallel with its longitudinal axis. This movement of convolution F causes rod 13 to move longitudinally against the action of spring 14. Continued movement of the displacing means will successively bring steps $e$ of shouldered members 30 and 31 into engagement with the outer end of convolution E, steps $d$ of shouldered members 30 and 31 into engagement with the outer end of convolution D, and so on until step $a$ of shouldered member 31 finally engages the outer end of convolution A at which time the opposite ends of the convolutions will have moved into engagement with the steps of shouldered members 28 and 29 and forward movement of the displacing means with respect to the coil receiving means is arrested. During the displacing process rod 13 is moved downwardly against the action of spring 14 and the latter is so designed that it will go solid shortly before the displacing means 6 reaches its limit of travel so that inner convolution F will be subjected to endwise pressure to cause its ends, which are in engagement with the peripheral shoulders 21 and 27 of the rod 13 and pin 25, respectively, to be disposed in planes substantially normal to the longitudinal axis of the extended coil. As soon as the displacing means is withdrawn from engagement with the volute spring thus formed, the helical spring 14 acting through the rod 13 will force the volute partly out of the coil receiving member.

From the foregoing it will be appreciated that by employing the method and apparatus herein described a volute spring of substantially any desired type may be easily and inexpensively formed.

I claim:

1. An apparatus for forming a volute spring from a substantially cylindrical coil having a plurality of overlapping convolutions, said apparatus involving a member having an opening for receiving the coil, a plate-like member disposed within the opening substantially radially of the opening, said plate-like member having stepped portions, and means movable relatively to said coil receiving member for displacing some of the convolutions of the coil, said stepped portions being respectively engageable with said convolutions for limiting the amount of displacement thereof.

2. An apparatus for forming a volute spring from a substantially cylindrical coil having a plurality of overlapping convolutions, said apparatus involving two relatively movable members, each of said members being provided with at least one plate-like member arranged substantially radially of the coil, each plate-like member having a plurality of stepped portions, the stepped portions of the plate member of one of said movable members being respectively engageable with the convolutions of the coil for displacing the latter and the stepped portions of the plate-like members of the other one of said movable members being engageable with the said convolutions for limiting the amount of displacement thereof.

3. An apparatus for forming a volute spring from a substantially cylindrical coil having a plurality of overlapping convolutions, said apparatus involving a member having an opening for receiving said coil, a plurality of plate-like members disposed within the opening of the coil receiving member, said plate-like members being arranged on opposite sides of a plane passing through the longitudinal axis of said opening and each having a plurality of stepped portions, and means for displacing some of the convolutions of the coil, said stepped portions being respectively engageable with said convolutions for limiting the amount of displacement thereof.

4. An apparatus for forming a volute spring from a substantially cylindrical coil having a plurality of overlapping convolutions, said apparatus involving means for receiving said coil, said means being provided with a pair of oppositely disposed plate-like members, and means movable axially of the coil also provided with a pair of oppositely disposed plate-like members, each of said pairs of plate-like members being provided with stepped portions and the stepped portions of one member of each pair being staggered with respect to the stepped portions of the other member of its pair, said stepped portions of the second-named means being engageable with some of the convolutions of the coil for displacing them relatively to the outermost one of said convolutions and the stepped portions of the first-named means being engageable with said convolutions for limiting the amount of displacement thereof.

5. An apparatus for forming a volute spring from a substantially cylindrical coil having a plurality of overlapping convolutions, said apparatus involving a member having an opening for receiving the coil, movable means normally disposed with said opening adapted to engage the coil, and a member movable into said opening for displacing some of the convolutions of the coil, said movable means being adapted to cause bodily displacement of the coil relative to the first-named member upon withdrawal of the second-named member from the opening.

6. An apparatus for forming a volute spring from a substantially cylindrical coil having a plurality of overlapping convolutions, said apparatus involving a member having an opening for receiving said coil, a spring pressed member normally disposed within said opening and having a portion adapted to be disposed within the innermost convolution of the coil, and means movable axially of the coil for displacing said innermost convolution relative to the other of said convolutions, said spring pressed member being adapted to cause bodily displacement of the coil relative to said coil receiving member after displacement of said innermost convolution.

7. An apparatus for forming a volute spring from a substantially cylindrical coil having a plurality of overlapping convolutions, said apparatus involving a member having a coil receiving opening, a spring actuated member normally disposed within said opening and engageable with said coil, and means movable relatively to said coil receiving member and axially of the coil for displacing some of said convolutions thereof relative to others of said convolutions, said spring pressed member being adapted to partially eject said coil from said opening after displacement of said convolutions.

8. An apparatus for forming a volute spring from a substantially cylindrical coil having a plurality of overlapping convolutions, said apparatus involving a base member, a member having an opening for receiving the coil secured to said base member, a removable shouldered member held between said base member and coil receiving member, and means movable axially of said coil for displacing some of the convolutions thereof varying amounts, said shouldered member having portions respectively engageable with said convolutions for limiting the amount of displacement thereof.

9. An apparatus for forming a volute spring from a substantially cylindrical coil having a plurality of overlapping convolutions, said apparatus involving a base member provided with a laterally projecting boss having a transversely extending groove, a shouldered member projecting into said groove, a member having an opening for receiving said coil, said last named member encircling said boss and serving to retain said shouldered member in said groove, and means movable axially of said coil for relatively displacing some of the convolutions thereof, said shouldered member having portions respectively engageable with said convolutions for limiting the amount of displacement of the latter.

10. An apparatus for forming a volute spring from a substantially cylindrical coil having a plurality of overlapping convolutions, said apparatus involving a coil receiving member, and means movable relatively to said member and axially of the coil, said means comprising a head member, a shouldered member, and removable means for clamping the shouldered member to the head, said shouldered member having portions engageable with some of said convolutions of the coil for displacing them relatively to others of said convolutions.

11. An apparatus for forming a volute spring from a substantially cylindrical coil having a plurality of overlapping convolutions, said apparatus involving a coil receiving member, and means movable relatively to said member and axially of the coil, said means comprising a head member, a pin member carried by the head having a portion adapted to enter within the innermost convolution of the coil, shouldered members disposed on opposite sides of said pin member, the latter being provided with grooves for receiving said shouldered members, and means for clamping said shouldered members to the head, said shouldered members having portions respectively engageable with some of the convolutions of the coil for displacing them relatively to others of the convolutions.

WILLIAM E. WINE.